United States Patent [19]

Lynch et al.

[11] 4,200,715
[45] * Apr. 29, 1980

[54] VAPOR PHASE PROCESSES FOR THE POLYMERIZATION OF OLEFINS

[75] Inventors: Thomas J. Lynch, Houston; Robert J. Rowatt, Orange, both of Tex.

[73] Assignee: Gulf Oil Corporation, Pittsburgh, Pa.

[*] Notice: The portion of the term of this patent subsequent to Jun. 19, 1996, has been disclaimed.

[21] Appl. No.: 907,444

[22] Filed: May 19, 1978

Related U.S. Application Data

[63] Continuation-in-part of Ser. No. 835,268, Sep. 21, 1977, abandoned.

[51] Int. Cl.$^2$ .......................... C08F 2/34; C08F 10/02
[52] U.S. Cl. ....................................... 526/88; 422/131; 526/106; 526/130; 526/142; 526/159; 526/169; 526/169.2; 526/901; 526/903
[58] Field of Search .............................. 106/271, 272; 252/426 R, 429 A, 430; 260/42.14, 610 R; 526/1, 64, 86, 88, 106, 159, 169, 169.2, 227, 352.2, 901, 903, 919, 142, 130

[56] References Cited

U.S. PATENT DOCUMENTS

| | | | |
|---|---|---|---|
| 2,967,834 | 1/1961 | Daniel et al. | 526/903 |
| 3,061,601 | 10/1962 | Watt | 526/901 |
| 3,361,681 | 1/1968 | Muller | 526/903 |
| 3,652,527 | 3/1972 | Trieschmann et al. | 526/159 |
| 3,779,712 | 12/1973 | Calvert et al. | 526/919 |
| 3,790,550 | 2/1974 | Miller | 526/86 |
| 3,849,334 | 11/1974 | Frielingsdorf et al. | 526/903 |
| 3,884,857 | 5/1975 | Ballard et al. | 526/227 |

*Primary Examiner*—Edward J. Smith
*Attorney, Agent, or Firm*—Richard L. Kelly

[57] ABSTRACT

A process is provided for the polymerization of an olefin such as ethylene in the vapor phase in a moving bed of particles of the polymerized olefin in which novel means are employed to feed the finely-divided solid polymerization catalyst to the polymerization zone. The process is carried out by pumping into the polymerization zone a Bingham fluid which has the finely-divided solid polymerization catalyst uniformly dispersed throughout a solid continuous phase, which is a mixture of a wax and a hydrocarbon which is a liquid at ambient temperature.

13 Claims, 2 Drawing Figures

VAPOR PHASE PROCESSES FOR THE POLYMERIZATION OF OLEFINS

CROSS REFERENCE TO RELATED APPLICATIONS

This application is a continuation-in-part of our earlier filed application Ser. No. 835,268, filed on Sept. 21, 1977, now abandoned.

The copending application of Thomas J. Lynch and Robert J. Rowatt Ser. No. 907,445, filed on May 19, 1978, which is a continuation-in-part of earlier application Ser. No. 838,776, filed Oct. 3, 1977, now abandoned, discloses the Bingham fluid compositions employed in the process of this invention. This application has been filed of even date with the present application and is assigned to the assignee of the present application.

BACKGROUND OF THE INVENTION

The polymerization of gaseous olefins such as ethylene and propylene in the vapor phase in a fluidized bed process offers attractively-low manufacturing costs in that no costs are incurred to recover and purify solvents. In the process, ethylene or propylene gas is fed into the bottom of the reactor and polymerization catalyst particles are blown into the reaction zone with an inert gas such as nitrogen. The ethylene polymerizes on the polymerization catalyst particles which are withdrawn from the bottom of the reactor. The unpolymerized ethylene is withdrawn from the top of the reactor as an overhead stream and is recycled.

A shortcoming of the process is that the conversion of ethylene to ethylene polymer is relatively low. As an inert gas is employed to blow the polymerization catalyst particles into the reaction zone, such inert gas accumulates in the reaction system. Periodically, a portion of the recycled ethylene gas must be purged to prevent too great a buildup of inert gas in the polymerization zone. The venting of the ethylene gas, of course is a cost burden on the process. In view of this fact, it would be desirable to have available to the art methods for introducing the polymerization catalyst particles into the reaction zone without the attendant accumulation of inert gas.

SUMMARY OF THE INVENTION

The applicants have discovered that finely-divided solid polymerization catalysts can be introduced into the polymerization zone of a vapor phase moving bed olefin polymerization process by pumping into the polymerization zone a Bingham fluid* which has the finely-divided solid polymerization catalyst uniformly dispersed throughout a solid continuous phase, which is a mixture of a wax and a hydrocarbon which is a liquid at ambient temperature.

*A Bingham fluid, sometimes referred to as a Bingham body, is a material which is a solid at a particular temperature under consideration, usually ambient temperature, but which will flow when subjected to an applied shearing stress which exceeds a minimum value characteristic of the system under consideration. For a description of the characteristics of Bingham fluids, see RHEOLOGY by Frederick Eirich, Academic Press Inc., New York City, Library of Congress Catalog Card 56-11131, particularly Volume 3, pages 198-201.

DETAILED DESCRIPTION OF THE INVENTION

Figure 1:
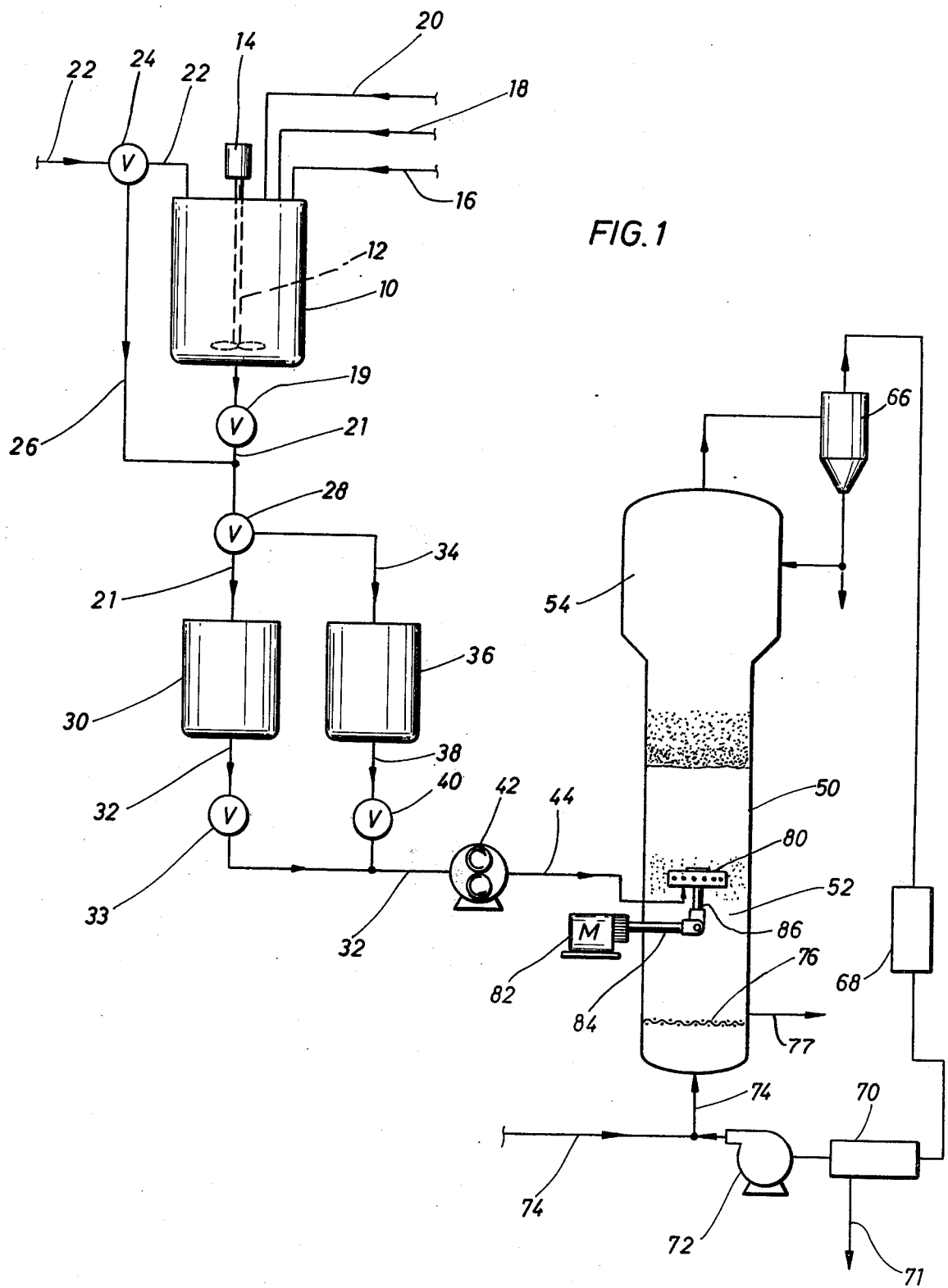
FIG. 1 is a schematic representation of apparatus which can be used in the practice of the invention.
Figure 2A:
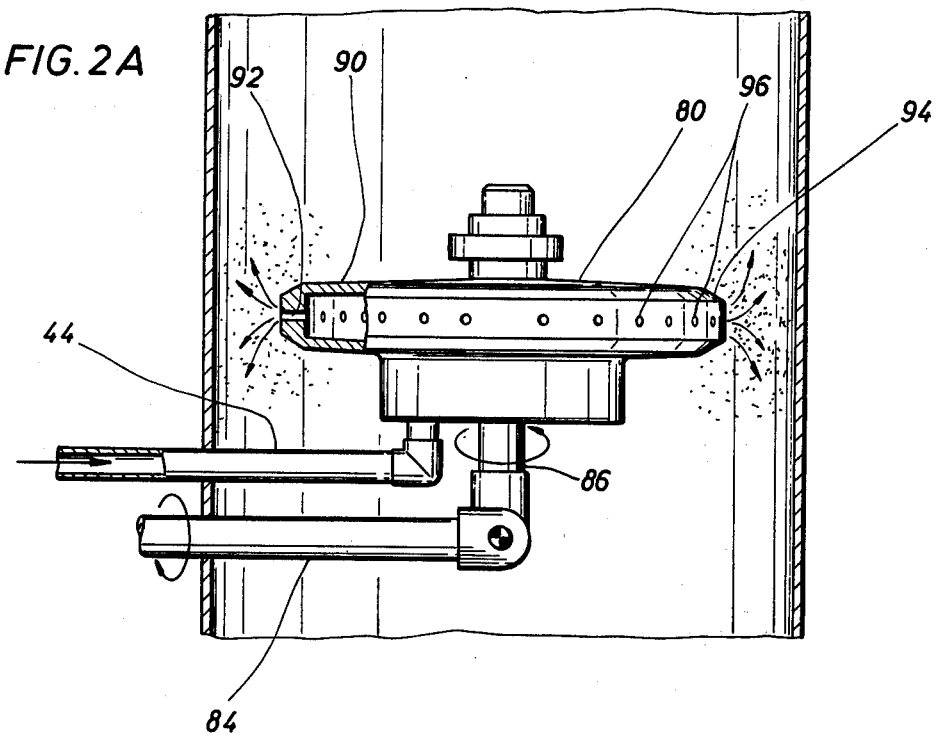
FIG. 2A is a schematic representation of an atomizing device that can be used to introduce the liquified Bingham fluid into the polymerization zone.
Figure 2B:
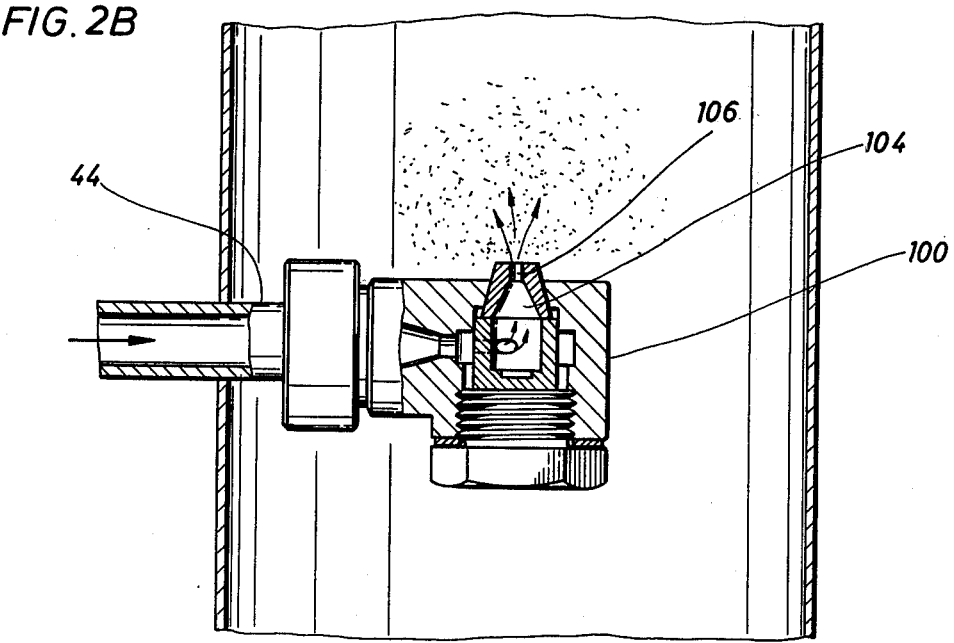
FIG. 2B is a schematic representation of another atomizing device that can be used to introduce the liquified Bingham fluid into the polymerization zone.

The continuous solid phase* of the Bingham fluid compositions of the invention consists of an intimate mixture of 100 parts by weight of a suitable wax and about 40-250 parts and preferably about 80-150 parts by weight of a liquid hydrocarbon. In special cases subsequently discussed, the wax and the liquid hydrocarbon can be employed in proportions outside of these ratios.

*The continuous solid phase customarily serves merely as a carrier for the catalyst particles. In special cases subsequently described, one or both components of the continuous solid phase can play a functional role.

The continuous solid phase of the Bingham fluid compositions of the invention, in most instances, is not a true solid in a classical chemical and physical sense. Rather, it is a network of extremely finely-divided wax particles dispersed throughout the liquid hydrocarbon. In many instances the wax particles may be bonded to each other in a semi-crystalline lattice. In certain physical characteristics, the continuous solid phase resembles a gel. Regardless of its precise chemical and/or physical state, for the purpose of describing and claiming the invention, the wax-liquid hydrocarbon mixtures will be characterized simply as a "continuous solid phase."

The wax component included in the Bingham fluid compositions of the present invention can be any of the known waxes, provided that it meets each of the following criteria:

1. At least 30 parts of the wax will be dissolved in 100 parts of n-heptane at 80° C.
2. A solution prepared per (1) above, when cooled to 20° C., forms a continuous solid phase having the characteristics described earlier herein.
3. The continuous solid phase prepared per (2) above will flow when subjected to a shear stress of 50 sec$^{-1}$. Suitable waxes are described in the *Kirk-Othner Encyclopedia of Chemical Technology*, Interscience Publishers, New York City, Second Edition, Library of Congress Card 63-1438, Vol. 22, pages 156-173, which description is incorporated herein by reference. Such waxes include the (a) animal waxes, e.g., bees wax, spermaceti wax, Chinese insect wax and shellac wax; (b) vegetable waxes, e.g., carnauba wax, candelilla wax, hydrogenated castor oil, ouricury wax, Japan wax, and bayberry wax; (c) mineral waxes, e.g., peat wax, montan wax, ozocerite wax, and petroleum waxes; and (d) synthetic waxes such as low molecular weight polyethylenes (which frequently are partially oxidized) and oxidized hydrocarbon waxes prepared from Fischer-Tropsch paraffins. The animal and vegetable waxes, while complex mixtures, are principally esters of a long chain fatty alcohol and a long chain fatty acid, although certain of the natural waxes also contain significant quantities of monoglycerides of long chain fatty acids such as glyceryl monostearate.

The preferred waxes for use in Bingham fluid compositions that are stored and used at ambient temperature, i.e., about 10 to 40° C., are the hydrocarbon waxes such as the petroleum waxes. Such hydrocarbon waxes are preferred by reason of their chemical inertness and their commercial availability in large volume at modest cost.

The petroleum waxes employed can be any one of the three principal categories of the petroleum waxes more specifically a paraffin wax, an intermediate wax, or a microcrystalline wax. As is recognized in the art paraffin waxes are predominately normal paraffins, straight chain saturated hydrocarbons which may contain minor amounts of isoparaffins. The microcrystalline waxes are predominately cyclic saturated hydrocarbons (naphthenes) and isoparaffins. The intermediate waxes are blends or mixtures of paraffin and microcrystalline waxes. Table I below sets forth certain of the physical and chemical properties of these three classes of waxes.

TABLE I

|  | Paraffin | Intermediate | Microcrystalline |
|---|---|---|---|
| Melting Point Range, ASTM D127° F. | 120–160 | 130–160 | 130–180 |
| Molecular Weight Range | 340–400 | 360–550 | 500–600 |
| Density Range | 0.80–0.917 | 0.85–0.93 | 0.89–0.94 |
| Gravity ASTM D287 °API, 210° F. | 35–60 | 30–55 | 30–50 |
| Distillation, Vacuum Corrected to 760 mm Hg 5% point, °F. | 750–810 | 825–900 | 950–1,050 |

A typical paraffin wax has the following properties:

| Gravity ASTM D287 °API | 41.3 |
|---|---|
| Melting point ASTM D87 °F. | 140.1 |
| Congealing point ASTM D938 °F. | 138.0 |
| Penetration ASTM D1321 at 77° F. | 14.0 |
| at 100° F. | 40.0 |
| Flash point, °F. | 455.0 |
| Ultraviolet absorbitivity at 280 mµ ASTM D2008 | 0.01 |
| Iodine number | 0.4 |
| Molecular weight | 442.0 |
| Refractive index | 1.4359 |
| Distillation vacuum corrected to 760 mm. Hg 5% point, °F. | 804.0 |

It is known that certain of the petroleum waxes, depending upon their source, contain minor quantities of chemicals containing nitrogen, oxygen and/or sulfur atoms. Such minor components are difficult to remove. If such components are objectionable, as when a Ziegler-type polymerization catalyst is included in the Bingham fluid compositions, equivalent hydrocarbon waxes can be prepared by synthetic methods, as by hydrogenating synthetic higher mono-1-olefins, particularly the $C_{18}$ to $C_{30}$ monoolefins. Alternatively, such mono-1-olefins themselves can be employed as the wax.

The liquid hydrocarbon included in the compositions of the invention can be any of the common hydrocarbons of either the aliphatic or aromatic type. It is preferred to employ relatively low boiling aliphatic hydrocarbons, particularly the pentanes, hexanes, heptanes, and octanes.

The wax and the liquid hydrocarbon, when heated to a temperature sufficiently high to melt the wax and subsequently cooled to ambient temperature provide thick mobile, single phase wax-like solids.* These blends, while solid at ambient temperature and pressure, flow readily under modest pressures of less than about 100 psig.**

*Since the continuous phase consists of a mixture of two hydrocarbons, the transition between the solid state and the liquid state is not sharp.

For the purpose of this invention, the continuous phase is considered to be a solid if it has the capability of holding finely-divided dispersed solids in suspension without significant settling for a period of 30 days at ambient temperature.

**A few isolated solids such as extremely fine silicas prepared by the burning of organosilicon compounds cause these Bingham fluids to gel. Such compositions flow only under higher pressures.

The precise physical characteristics of the wax-liquid hydrocarbon solid blends will depend somewhat upon the chemical type and the boiling point of the liquid hydrocarbon, and the chemical type and melting point of the wax employed. The ratio of the two components also has an effect upon the physical properties of the resultant blends. It has been observed, however, that by proper selection of the wax and the liquid hydrocarbon, and the proportions of the two components, it is possible to prepare compositions that are homogeneous at ambient temperature and will retain their single phase solid state over the normal range of ambient temperature encountered in the temperate zone, specifically from about 10° C. to about 40° C. Compositions of optimum properties are obtained when a hydrocarbon wax having a melting point in the range of about 60–80° C. is blended with a $C_5$–$C_{10}$ aliphatic hydrocarbon, with about 80 to 150 parts of liquid hydrocarbon being employed per 100 parts of the hydrocarbon wax. In special cases, the functional material dispersed in the continuous solid phase can have an effect on the physical properties of the continuous solid phase. This phenomenon will be discussed subsequently.

The continuous solid phases of the Bingham fluids described above, by reason of being based on a hydrocarbon that is a liquid at ambient temperature, are solids at ambient temperature and atmospheric pressure. If the Bingham fluids are to be employed at subambient temperatures and/or stored at pressures above atmospheric, it is possible to employ in the continuous solid phase lower boiling hydrocarbons such as butane, butene-1, propane, propylene, or ethylene. These lower boiling hydrocarbons, for the limited purpose of the present invention, are considered to be liquid hydrocarbons.

It will be recognized, of course, that such systems must be maintained at temperatures and pressures below the critical point of the liquid hydrocarbon included in the Bingham fluid composition. The critical point for ethylene is 9.9° C. and 50.5 atmospheres. The use of ethylene as the liquid hydrocarbon is desirable where the Bingham fluid compositions are introduced into an ethylene polymerization reactor and it is desired to hold the introduction of extraneous compounds into the polymerization zone to an absolute minimum.

Where a Bingham fluid composition is employed containing a liquid hydrocarbon of the type described in the second paragraph above and is stored at a temperature below 10° C., it is feasible and usually desirable to employ as the wax an aliphatic hydrocarbon which is a liquid at the critical temperature of the liquid hydrocarbon, but which is a wax-like solid at the temperature at which the Bingham fluid is to be stored. $C_{15}$ or lower aliphatic hydrocarbon can be employed with $C_{10}$ to $C_{15}$ aliphatic hydrocarbons being preferred. Mixtures of ethylene and dodecane or tetradecane can be used with advantage as the continuous solid phase of such Bingham fluid compositions.

To prepare Bingham fluid compositions for addition to propylene polymerization systems, propylene desirably may be employed as the liquid hydrocarbon component. The critical point for propylene is 91.9° C. and 45.4 atmospheres. Thus such Bingham fluid compositions can be stored at ambient temperature, but must be stored under a propylene pressure sufficiently high to maintain the propylene in the liquid state at the prevailing temperature.

The solids to be employed in the Bingham fluid compositions are finely-divided inorganic materials which have the capability of catalyzing the polymerization of polymerizable olefins such as ethylene and propylene in a fluidized bed process. One example of such inorganic polymerization catalysts consists of a chromium catalyst supported upon a silica or a silica-alumina support. The chromium catalyst may be present as chromia, or certain organochromium compounds such as dicyclopentadienyl chromium (II), and other similar organo-chromium compounds of the type disclosed in the following-issued U.S. Pat. Nos.: 3,157,712, 3,709,954, 3,324,095, 3,756,998, 3,324,101, 3,757,002, 3,687,920, 3,806,500, 3,709,853.

A second example of such inorganic polymerization cstalysts consists of the so-called Ziegler-type catalysts which are the reaction product of a salt of a transition metal of Group IV-B, V-B, or VI-B of the Periodic Table; and an organometallic compound of a metal of Group II-A, II-B, or III-A of the Periodic Table. The Periodic Table referred to is the same Periodic Table referred to in U.S. Pat. No. 3,219,648. The preferred examples of such catalysts are the reaction products of a titanium chloride and an aluminum alkyl. Desirably, such Ziegler-type catalysts may be deposited on an inert support to provide a large ratio of catalyst surface to catalyst weight. A detailed description of the above types of polymerization catalysts are set forth in the text *Crystalline Olefin Polymers - Part I* by R. A. V. Raff and K. W. Doak, Interscience Publishers, 1965, Library of Congress Catalog Card No. 64, 12191; which description is incorporated herein by reference.

The percentage of the finely-divided solids to be dispersed in the Bingham fluid compositions of the invention can be varied over a wide range and normally will be set to facilitate the incorporation of the appropriate quantity of the dispersed solid into the desired material by pumping of the Bingham fluid composition into the desired medium. Customarily, the finely-divided solids will be dispersed in the Bingham fluid compositions of the invention in the range of about 1–60 weight %, preferably about 1–40 weight %, and especially about 5–20 weight % of the total composition.

An attractive feature of the invention is that additional materials desirably to be incorporated into the polymerization zone can be included in the Bingham fluid compositions. Among the additional materials that can be incorporated into the Bingham fluid compositions are comonomers such as mono-1-olefins that can contain as few as 2 carbon atoms (as when ethylene is included as a comonomer in the Bingham fluid composition employed to feed the catalyst to a propylene polymerization) to as many as 30 carbon atoms when such long chain mono-1-olefins are included in a Bingham fluid composition employed to feed the catalyst to an ethylene polymerization. More typical comonomers employed include butene-1 and hexene-1.

The flexibility of being able to include comonomers in the Bingham fluid composition is a matter of significant importance in the vapor phase polymerization of ethylene. By including such comonomers in the Bingham fluid composition, the comonomer, whether it be normally a gas or liquid at ambient temperature, can be introduced into the polymerization zone continuously at a predetermined fixed rate. Moreover, a mixture of monomers can be added to the polymerization zone in a fixed ratio to control the degree and type of branching in the recovered ethylene polymer. As is recognized, the degree and type of branching affects both the density and rheology of ethylene polymers.

In selected special cases where a comonomer is included in the Bingham fluid composition, such comonomer may serve as a partial or complete replacement for either the wax or liquid hydrocarbon included in the continuous solid phase of the Bingham fluid composition. Thus, a binary mixture of wax and a liquid mono-1-olefin such as hexene can be used as the continuous solid phase of a Bingham fluid composition. The hexene serves the dual function as the liquid hydrocarbon component of the continuous solid phase and as a comonomer. As earlier noted, higher mono-1-olefins such as $C_{20}$ to $C_{30}$ mono-1-olefins are waxes. For this reason, a binary mixture of a $C_{30}$ mono-1-olefin and hexane can be used as the continuous solid phase of a Bingham fluid composition. In this system, the higher mono-1-olefin serves the dual function as the petroleum wax of the continuous solid phase and as a comonomer.

Certain inorganic solids when employed in admixture with liquid hydrocarbons function as Bingham fluids. Examples of such materials include siliceous materials which contain hydroxyl groups which can be considered to be polymeric materials containing the grouping

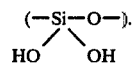

Typical examples of such materials are the products sold under the trade designation Cabosils*. If such materials are employed as supports for the active catalyst, such supported catalysts can serve as a partial replacement for the petroleum wax in the Bingham fluid compositions.
*Trademark of Cabot Corporation.

The Bingham fluid compositions of the invention are preferably prepared by heating the desired proportions of wax and the liquid hydrocarbon in a stirred vessel and adding the finely-divided solid particles thereto. This mixture is agitated with sufficient intensity to disperse the suspended solids uniformly throughout the melt, after which the entire composition is cooled until it solidifies. The solidified mixture then is transferred to a suitable storage vessel.

The conditions required to polymerize an olefin such as ethylene in the vapor phase in a moving bed of particles of the polymerized olefin are reported in the literature and such details will not be repeated herein. One technique involves fluidizing the bed of polymerized olefin particles by blowing the polymerizable olefin upwardly through the bed. For a description of the process parameters and the apparatus employed, see U.S. Pat. No. 3,970,036 whose descriptions are incorporated herein by reference. Another technique involves charging the polymerized olefin particles to a stirred reactor and charging the olefin vapor and the catalyst particles to the reactor.

These prior art methods and apparatus can be employed in the present invention with only minor modifications being made to feed the Bingham fluid composition to the polymerization zone. Suitable means are employed to disperse the Bingham fluid into the polymerization zone in the form of small droplets.

The apparatus illustrated in FIG. 1 contains a reactor 10 provided with a stirrer 12 driven by a motor 14. The reactor 10 is constructed so that it can operate under an applied pressure of at least about 100 psig. Lines 16, 18, and 20 are provided to feed to the reactor, respectively, a liquid hydrocarbon, a wax, and a finely-divided solid which is to be the dispersed solid phase in the final Bingham fluid composition. A gas line 22 fitted with a two-way valve 24 is provided so that the reactor 10 can be pressurized to discharge the Bingham fluid composition from reactor 10 via outlet line 21, which contains a valve 19. Line 21 is connected to storage vessel 30. A two-way valve 28 is provided in line 21 so that the Bingham fluid composition from reactor 10 also can be fed through line 34 to a second storage vessel 36 which is maintained in parallel with storage vessel 30. A transfer line 32 equipped with a valve 33 is provided in storage tank 30 so that the Bingham fluid composition contained therein can be transferred therefrom by means of gear pump 42. In a like manner, an outlet line 38 equipped with a valve 40 is provided in storage tank 36 for feeding the Bingham fluid composition through line 32 to gear pump 42.

In the preparation of the Bingham fluid composition, a melted wax is introduced into reactor 10 through line 16. Liquid hydrocarbon is fed to reactor 10 through line 18. The wax and the liquid hydrocarbon are maintained at a temperature sufficiently high to keep the mixture liquid and are stirred to provide a homogeneous liquid phase. The desired solids then are fed to reactor 10 via line 20. Stirring is continued to thoroughly disperse the solids in the continuous liquid phase. The contents of the reactor 10 then are cooled to the point at which the total composition is just above the gel point. The lines 16, 18, and 20 then are sealed by suitable valves not shown and the reactor is pressurized by an inert gas introduced into the reactor via line 22. Valves 19 and 28 are opened and the Bingham fluid composition in reactor 10 is transferred via line 21 to storage tank 30.

To assure that an adequate supply of Bingham fluid composition is available at all times, the operations above-described are repeated with the exception that valve 28 is turned so that the Bingham fluid composition prepared in reactor 10 is transferred to the second storage tank 36.

With the storage tanks 30 and 36 filled with the desired Bingham fluid composition, the apparatus is in a condition to feed the Bingham fluid composition into ethylene polymerization reactor 50. Valve 19 is closed and valves 24 and 28 are set so that gas from line 22 is fed through line 26 into line 21 so as to apply a pressure on the contents of storage tank 30. The pressure applied on storage tank 30 converts the Bingham fluid composition to the liquid phase and forces the composition through line 32 and valve 33 to gear pump 42 which feeds the composition through line 44 into polymerization reactor 50. Polymerization reactor 50 is of conventional design and includes a reaction zone 52 and a velocity reduction zone 54. The reaction zone 52 comprises a bed of growing polymer particles, formed polymer particles and catalyst fluidized by a continuous upward flow of ethylene gas which consists of fresh ethylene feed and recycled ethylene. To maintain a viable fluidized bed, mass gas flow is typically in the order of from 2 to about 6 $G_{mf}$ or more, with fluidization achieved by a high rate of gas recycle to and through the bed typically in the order of about 50 times the rate of feed or makeup gas. $G_{mf}$ is used in the accepted form as the abbreviation for the minimum mass gas flow required to achieve fluidization, C. Y. Wen and Y. H. Yu, "Mechanics of Fluidization," Chemical Engineering Progress Symposium Series, Vol. 62, pages 100–110 (1966). In general, the fluidized bed appears as a dense mass of viable particles in possible free vortex or bubbling flow as created by the percolation of gas through the bed with free vortex or bubbling flow established by the fact that axial pressure drop through the bed generally is only in the order of about 1 psig.

In normal or continuous operation of the fluidized bed, makeup gas is fed via line 74 to the bed at a rate about equal to the rate at which a portion of the bed is withdrawn as product through line 77. That portion of the gaseous stream which does not react in the bed constitutes recycle gas which is removed from the polymerization zone preferably by passing it into a velocity reduction zone 54 wherein retained particles or fines are given an opportunity to return to the bed. Return may be further aided by a cyclone 66 which may be part of the velocity reduction zone or exterior thereto. The recycle gas is then typically passed through a filter 68 to remove more fine particles, through a heat exchanger 70 and compressor 72 before it is returned to the bed via line 74 at a point below a distributor plate 76 which serves to diffuse the gas through the bed to keep the particles at the base of the bed viable and to support a quiescent bed of resin particles when the reactor is not in operation.

An atomizer is included in reaction zone 52 to break up the Bingham fluid into five droplets before it is introduced into the fluidized bed. The atomizer 80 shown in FIG. 1 is driven by a motor 82 which is connected to the atomizer by means of coupled drive shafts 84 and 86. The atomizer 80 is of a commercial design designated as a Lurgi Centrifugal Atomizer. Such units are sold commercially and are described in Bulletin KSD-5 of Koch Engineering Company, Inc., of Wichita, Kansas, which description is incorporated herein by reference.

As illustrated in FIG. 2A, atomizer 80 contains a rotating internal element 80 which has an orifice 92 therein. The liquified Bingham fluid is pumped into element 90 and thrown outwardly toward orifice 92 by centrifugal force. A cover housing 94 containing a plurality of openings 96 surrounds element 92. Small droplets of the Bingham fluid exiting orifice 92 pass through the openings 96 into the fluidized bed present in polymerization zone 52.

FIG. 2B illustrates an alternative atomizer 100 which can be used in lieu of atomizer 80. Atomizer 100 is of a commercially-available design designated at a Lurgi Single Fluid Pressure Nozzle Atomizer. Such units also are described in Bulletin KSD-5 of Koch Engineering Company previously referred to and incorporated herein by reference. The liquified Bingham fluid is pumped through line 44 into a pressure resistant cavity 104 which has an outlet orifice 106 therein. The Bingham fluid is forced out of orifice 106 as fine droplets.

When the fine droplets of the Bingham fluid enter into the reaction zone 52, the liquid hydrocarbon component of the solid phase of the Bingham fluid will vaporize, since the reaction zone normally will be operated at a temperature of about 90° C. or somewhat higher. The liquid hydrocarbon will leave the reactor with the recycle gas and be recovered from heat exchanger 70 via line 71. The wax component of the Bingham fluid will be rapidly melted and adsorbed on the polymer particles present in reaction zone 52. The wax is introduced in such a small quantity as to have no observable effect upon the ethylene polymer being produced.

To prepare Bingham fluid compositions containing a normally gaseous hydrocarbon such as ethylene as the liquid hydrocarbon component of the Bingham fluid compositions, it is necessary to operate at reduced temperatures and elevated pressures. The reactor 10 is charged with a hydrocarbon such as tetradecane (which will function as the equivalent of the petroleum wax) and the solid catalyst particles. The mixture is well stirred and ethylene is admitted to reactor 10 at a pressure well in excess of 50.5 atmospheres. Reactor 10 then is cooled to a temperature well below 9.9° C. to liquidy the ethylene. As the composition in reactor 10 is about to solidify, valves 19 and 28 are opened to transfer the Bingham fluid composition to storage vessel 30 which will be maintained well below 9.9° C. Valve 19 then is closed and valves 24 and 28 are adjusted so that storage vessel 30 is maintained under an ethylene pressure in excess of 50.5 atmospheres. When valve 33 is opened, the Bingham fluid composition will flow through line 32 to gear pump 42, Line 32, valve 33, and gear pump 42 will be maintained at a temperature below 9.9° C.

The following examples are set forth to illustrate more clearly the principle and practice of this invention to those skilled in the art. When parts and percentages are mentioned, they are parts and percentages by weight unless otherwise specifically noted.

EXAMPLE 1

A paraffin wax* having a melting point of 54°–56° C., in the amount of 716 gms, is melted and charged to reactor 10 which had a 3-liter capacity. The melted wax is cooled to a temperature of about 65° C. and approximately 500 ml of n-heptane are charged to the reactor. The contents of the reactor are cooled to about 55° C. and 50 grams of the organochromium compound supported on silica described in Example I of U.S. Pat. No. 3,790,036 are charged to the reactor. Stirring is continued until the temperature is reduced to 40° C., at which point incipient solidification of the composition begins to take place. Valves 19 and 28 are opened and a nitrogen pressure of 50 psig is introduced into reactor 10 by line 22 to transfer the contents of reactor 10 to storage tank 30.

*The wax was a synthetic paraffin prepared by hydrogenating a mixture of synthesized mono-1-olefins containing about 30 carbon atoms.

The above-prepared Bingham fluid can be used as the catalyst feed to prepare ethylene polymer of good quality employing the polymerization conditions set forth in Example II of U.S. Pat. No. 3,790,036. An ethylene polymer of substantially equivalent properties is obtained with a high yield of polymer being obtained per unit of catalyst charged. The reactor can be run indefinitely with no necessary of venting any ethylene gas to remove inerts from the system.

EXAMPLE 2

A paraffin wax having a melting point of 54°–56° C., in the amount of 716 gms, is melted and charged to reactor 10 which had a 3-liter capacity. The melted wax is cooled to a temperature of about 65° C. and 740 ml of a 20 weight % solution of triethyl aluminum in n-heptane is charged to the reactor. The contents of the reactor are cooled to about 55° C. and 109 gms of particulate aluminum-reduced titanium trichloride are charged to the reactor. Stirring is continued until the temperature is reduced to 40° C., at which point incipient solidification of the composition begins to take place. Valves 19 and 28 are opened and a nitrogen pressure of 50 psig was introduced into reactor 10 by line 22 to transfer the contents of reactor 10 to storage tank 30.

The above-prepared Bingham fluid can be used as the catalyst feed to polymerize ethylene conditions similar to those disclosed in U.S. Pat. No. 3,790,036.

What is claimed is:

1. In a process for the catalytic polymerization of a polymerizable olefin in the vapor phase in the presence of solid polymerization catalyst particles in a moving bed of particles of the polymerized olefin; the improvement which consists essentially of feeding the solid polymerization catalyst particles to the polymerization zone by pumping a Bingham fluid into the polymerization zone, said Bingham fluid being a solid at ambient temperature and consisting essentially of finely-divided solid polymerization catalyst particles uniformly dispersed in a continuous solid phase which consists essentially of an intimate mixture of a wax which is a solid at ambient temperature and a hydrogen which is a liquid at ambient temperature.

2. The process of claim 1 in which the bed of particles of the polymerized olefin is kept in motion by passing the polymerizable olefin upwardly through the bed.

3. The process of claim 1 in which the bed of particles of the polymerized olefin is kept in motion by stirring the bed.

4. The process of claim 1, 2, or 3 in which the olefin is ethylene.

5. The process of claim 1, 2, or 3 in which the olefin is ethylene and the solid polymerization catalyst particles consist of a chromium compound supported on finely-divided silica.

6. The process of claim 1, 2, or 3 in which the solid polymerization catalyst particles are the reaction product of a salt of a transition metal of Group IV-B, V-B, or vI-B of the Periodic Table and an organometallic compound of a metal of Group II-A, II-B, or III-B of the Periodic Table.

7. The process of claim 1, 2, or 3 in which the polymerization catalyst is the reaction product of a titanium chloride and an aluminum alkyl.

8. A process of claim 1 in which the continuous solid phase consists essentially of 100 parts by weight of a hydrocarbon wax and about 40 to 250 parts by weight of the liquid hydrocarbon.

9. The process of claim 8 in which the olefin is ethylene.

10. The process of claim 8 in which the solid polymerization catalyst particles consist of a chromium compound supported on a finely-divided silica.

11. The process of claim 8 in which the solid polymerization catalyst particles are the reaction product of a salt of a transition metal of Group IV-B, V-B, or VI-B of the Periodic Table and an organometallic compound of a metal of Group II-A, II-B, or III-B of the Periodic Table.

12. The process of claim 8 in which the polymerization catalyst is the reaction product of a titanium chloride and an aluminum alkyl.

13. In a process for the catalytic polymerization of ethylene in the vapor phase in the presence of solid polymerization catalyst particles in a moving bed of particles of the polymerized olefin; the improvement which consists essentially of feeding the solid polymerization catalyst particles to the polymerization zone by pumping a Bingham fluid into the polymerization zone, said Bingham fluid being a solid at subambient temperature and consisting essentially of finely-divided solid polymerization catalyst particles uniformly dispersed in a continuous solid phase which consists essentially of 100 parts by weight of a $C_{10}$ to $C_{15}$ aliphatic hydrocarbon and about 40 to 250 parts by weight of ethylene.

* * * * *